(No Model.)
H. J. BREWER.
BATTERY COVER.
No. 579,916.  Patented Mar. 30, 1897.
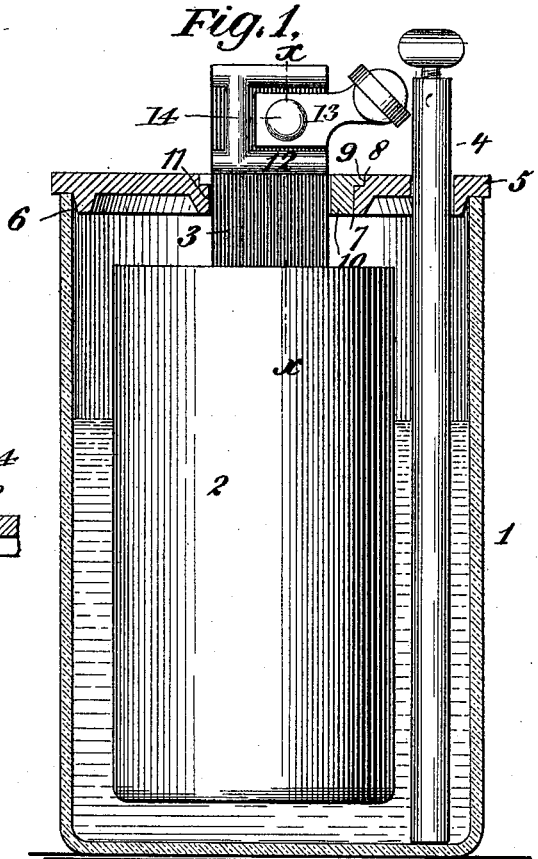
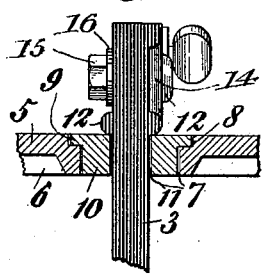
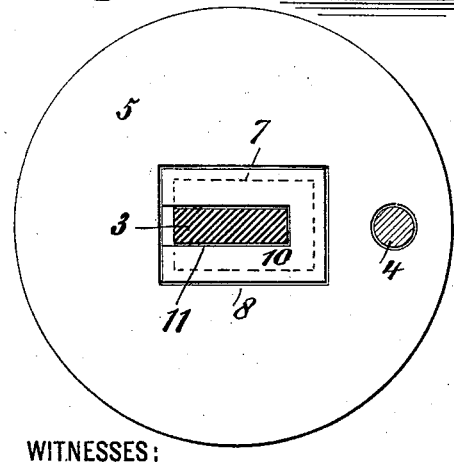
WITNESSES:
INVENTOR
Horatio J. Brewer
BY Edwin H. Brown
HIS ATTORNEY

UNITED STATES PATENT OFFICE.

HORATIO J. BREWER, OF NEW YORK, N. Y.

BATTERY-COVER.

SPECIFICATION forming part of Letters Patent No. 579,916, dated March 30, 1897.

Application filed October 2, 1896. Serial No. 607,718. (No model.)

*To all whom it may concern:*

Be it known that I, HORATIO J. BREWER, of New York, in the county and State of New York, have invented a certain new and useful Improvement in Battery-Covers, of which the following is a specification.

My invention relates to a cover for batteries, and is especially designed to provide a means for supporting one element of the battery and at the same time effectually closing the opening of the battery-jar.

It is also the object of the invention to provide a ready and efficient means of removing the cover from the jar, and also for taking out a battery element which is supported by the cover.

In the drawings I have shown a form of battery provided with a cover embodying the principle of my invention, in which—

Figure 1 is a view, partly in vertical section, of a battery provided with a cover and made in accordance with my invention. Fig. 2 is a detail sectional view along the line *x x*, Fig. 1. Fig. 3 is a plan view partly in section.

Like numerals of reference refer to like parts in all the figures.

Referring to the drawings in detail, 1 represents a battery-jar, which is shown as provided with a porous cup 2, in which is the carbon element 3, and 4 is the zinc element of the battery, these parts being of the usual construction.

5 represents a cover. This cover is made with a flange 6, downwardly depending on the inside of the jar 1, and at approximately its central portion is provided with an opening 7, so proportioned in size as to permit of the passage of the carbon element and the terminal point through it. This opening is provided with a countersunk portion 8, adapted to receive a shoulder 9, formed on a piece 10, which is adapted to surround the carbon element and fit snugly in the opening 7, formed in the cover 5. This piece 10 is made of size to fit the opening 7 and is provided with a cut-out portion 11 of size corresponding to the size of the carbon element it is intended to support.

13 is the terminal point of the carbon electrode to which one of the battery-wires is attached, this terminal point being secured to the electrode by a bolt 14, passing through the electrode and secured on the opposite side thereof by a nut 15 and washer 16.

The mode of using the device is as follows: Assuming the battery-jar 1 to contain only the porous cup and carbon element, the cover 5 is passed over the top of the carbon element and placed in position resting on the top of the jar 1. The porous cup and carbon element are then lifted so that the shoulders 12 formed thereon come above the upper surface of the cover 5. The piece 10 is then placed in position in the opening 7, and the carbon element and porous cup depending therefrom are lowered until the shoulders 12 rest upon the piece 10, as shown in Fig. 1, after which the zinc element is introduced.

I do not wish to limit myself to the precise construction shown, as it will be obvious that many variations may be made from the construction shown in the drawings without departing from the spirit of my invention.

What I claim as my invention, and desire to secure by Letters Patent, is—

1. A battery-cover provided with an opening through which the upper portion of one element of the battery is adapted to pass, and a discontinuous closure fitting the said opening and the portion of the battery element passed through, the said closure being so constructed that it may be placed in position to close the opening around the battery element and support the same without passing the battery element through said closure, substantially as specified.

2. A battery-cover provided with an opening through which the upper portion of one element of the battery is adapted to pass, and a piece adapted to fit said opening in the cover and provided with a slot at one end adapted to fit a battery element, whereby the battery-jar is closed and the element supported in position, substantially as specified.

In testimony whereof I have signed my name to this specification in the presence of two subscribing witnesses.

HORATIO J. BREWER.

Witnesses:
ANTHONY GREF,
ERNEST HOPKINSON.